No. 779,047. PATENTED JAN. 3, 1905.
D. E. KEMPSTER.
REVERSIBLE CHUCK.
APPLICATION FILED OCT. 30, 1902.
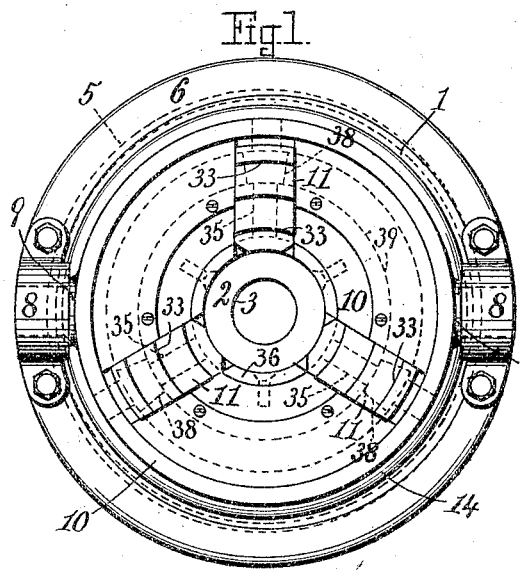
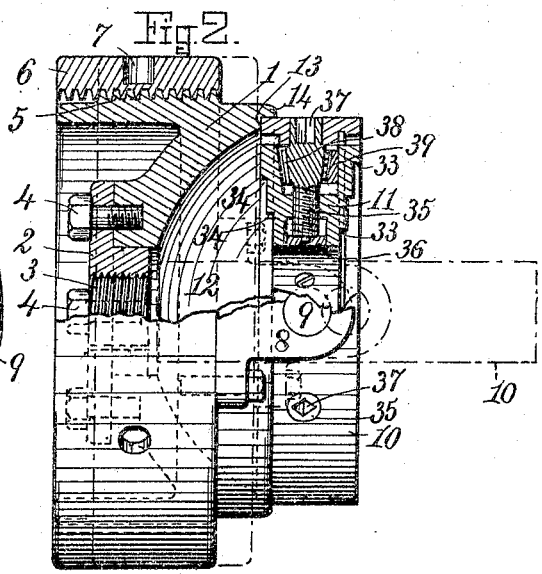
Witnesses
Arthur C. Jones
Gertrude M. Walsh
Inventor
Daniel E. Kempster
by Henry Chadbourn
his atty.

No. 779,047.  Patented January 3, 1905.

UNITED STATES PATENT OFFICE.

DANIEL E. KEMPSTER, OF BOSTON, MASSACHUSETTS.

REVERSIBLE CHUCK.

SPECIFICATION forming part of Letters Patent No. 779,047, dated January 3, 1905.

Application filed October 30, 1902. Serial No. 129,357.

*To all whom it may concern:*

Be it known that I, DANIEL E. KEMPSTER, of Boston, in the county of Suffolk and State of Massachusetts, have invented certain new and useful Improvements in Reversible Chucks, of which the following is a specification.

This invention relates to improvements in reversible chucks used more especially to hold work while it is being operated upon in a lathe or other machine; and it has for its principal object to provide convenient means whereby articles held in the chuck may be operated upon from opposite sides thereof and all the surfaces thus formed on opposite sides of the article will be concentric with each other; also, to provide means independent of the reversing mechanism whereby the chuck will be positively centered with relation to the axis upon which the chuck rotates and to otherwise improve the chuck, as will be fully described hereinafter and claimed. This forming of surfaces concentric and in line with each other on opposite ends of articles held in a chuck is very essential in some of the surfaces upon certain valve-casings, automobile-hubs, and in other castings in which an internal projecting rib or member is to be formed intermediate turned surfaces formed on opposite sides of said rib or member and also in many other articles.

The invention consists of the novel construction, arrangement, and combinations of parts, as will be fully described hereinafter and set forth in the claims annexed hereto, and it is carried out substantially as illustrated on the accompanying drawings, which form an essential part of this specification, and whereon like characters of reference refer to like parts wherever they occur on the different parts of said drawings.

Figure 1 represents a front elevation of one form of my improved chuck, which form is in many respects the preferred form of my invention. Fig. 2 represents a sectional side elevation of the chuck shown in Fig. 1. Fig. 3 represents a sectional plan of the same chuck. Fig. 4 represents a front elevation of another embodiment of my improved chuck and showing the same provided with a back rest to assist in preventing the vibrations of the chuck while the article held thereby is being operated on. Fig. 5 represents a side elevation of the chuck shown in Fig. 4 and showing a section of the back rest used with the same. Fig. 6 represents a side elevation of another embodiment of my improved chuck in which articles may be held and turned in planes at various angles to the outer surface of the article. Fig. 7 represents a side elevation of still another form of my improved chuck.

In carrying out my invention I use, preferably, what is known as a "ring-chuck," having a central perforation or space within which the article may be held and remains until finished and through which the tools or formers used may pass in performing this work. I introduce a carrier between the chuck and the spindle of the lathe, and I mount the chuck upon this carrier in such a manner that it may be turned upon trunnions, so as to reverse the chuck. I also provide means whereby the chuck and carrier may be firmly connected or held together in either of the positions to which the chuck is turned. The chuck and its carrier are so related to each other that when an article is held within the chuck the chuck and article may be turned upon the pivotal connection of the chuck to the carrier, so as to present the desired end of the article to the action of tools used on the lathe or other machine. In order to add to the usefulness of the chuck, I prefer to make the same with clamping-jaws on the opposite faces of the same, as will be understood by the complete description herein contained.

Various arrangements may be used to clamp or hold the chuck firmly in its proper positions relative to the carrier while the article is being finished or formed, and I have shown a number of such arrangements on the drawings.

Referring to the embodiment of my invention as shown in Figs. 1, 2, and 3, the member 1 is provided with means whereby it may be attached to the shaft or spindle of a lathe or other machine, and on the drawings I have shown such means as consisting of a face-plate 2, provided with an internal screw-threaded perforation 3 to receive the screw-threaded end of the spindle, which face-plate may be secured to the member in any desired way, as by means of the bolts 4 4 shown. The member 1 is cylindrical on its exterior and is provided with a screw-threaded portion 5. The pitch of the thread of this screw-threaded portion is preferably made quick and the threads are made double, triple, or quadruple, as desired, and for a purpose to be described hereinafter. An internally-screw-threaded sleeve 6 is mounted upon the screw-threaded portion of the member 1 and is provided with holes or recesses 7 on its exterior for the reception of a bar or spanner, by which it may be turned upon the threads on the member 1, so as to move said sleeve longitudinally in relation to said member for a purpose to be described hereinafter. The sleeve 6 is provided with the ears or projections 8 8, which are made in one piece therewith or firmly attached thereto, but which are preferably removably attached to said sleeve by means of screws, as shown. Within bearings in the ears 8 are rotatably mounted the trunnions 9 9, which project from the body portion 10 of the chuck and upon which said body portion 10 of the chuck may be turned in order to present either face of the chuck desired. This body portion 10 of the chuck is preferably made in the form of a ring and is provided with a plurality of chuck-jaws 11 11, which are adjustably mounted on said body portion, so as to be moved radially thereon in order to clamp and hold an article firmly to said chuck. The member 1 is provided with a cup-shaped recess 12 on its outer face, and it will be seen that when the sleeve 6 is turned upon the member 1, so as to move it longitudinally thereon to the position indicated by broken lines in Fig. 2, this cup-shaped recess will allow the chuck to be turned bodily on its trunnions 9 around an entire circle or any portion of a circle. On the drawings in Fig. 2 I have shown the chuck in broken lines as turned one-quarter of an entire revolution from the position shown in full lines. By this turning of the chuck upon its trunnions I am able to present either face of the chuck to the outside. The member 1 is provided with an annular surface 13, against which the inner face of the chuck is drawn and held when the sleeve 6 is turned to the position shown in full lines in Fig. 2. The member 1 is also provided with an annularly-projecting lip 14, which forms a recess exactly fitting the outer surface of the body of the chuck, and thus assists the trunnions in preventing any movement of the body 10 of the chuck upon the surface 13 on the member 1. By interposing a carrier between the chuck and the spindle or shaft of the lathe or other machine on which it is used, pivotally mounting the chuck upon the carrier in such a manner that it can be rotated upon an axis which intersects the axis of rotation of the shaft of the lathe or other machine and providing means whereby the chuck and carrier may be held rigidly together, I am able to clamp an article within the chuck and turn the article end for end in relation to the carrier and be sure that the same portion of the article will coincide with the axis of the shaft of the lathe or other machine, thus insuring that all surfaces turned on either end of the article will be perfectly concentric or in line. It will be seen that this reversal of the ends of the article to the operating-tools will be accomplished without removing the article from the chuck and without any fine adjustment of the parts, as the parts must necessarily come automatically into proper positions relative to each other. In order to prevent chips from entering and wearing the thread between the member 1 and sleeve 6, I cut away a portion of the threads on the member 1 at each end thereof equal substantially to the amount of movement of the sleeve upon the member 1 necessary to allow the chuck to be turned entirely around on its trunnions, if desired.

In Figs. 4 and 5 I have illustrated another form of carrier which I interpose between the chuck and the shaft or spindle of the lathe or other machine. In this form the carrier is made in one piece, 15, which is attached to the shaft of the lathe or other machine, either directly or by means of a face-plate 2, with screw-threaded perforation 3 and the bolts 4 similar to the member 1 above described. The carrier 15 is provided with the ears or projections 8, which form bearings for the trunnions 9 on the body portion 10 of the chuck in a manner similar to those above described and for a similar purpose. This carrier 15 is chambered on its outer face to a sufficient depth to allow of the turning of the chuck upon its trunnions, as shown by broken lines in Fig. 5, and the shell of the carrier 15 is provided with a number of perforations 16, which act to lessen the weight of the carrier and allow any chips or dirt to drop out from the chambered portion thereof while the same is being rotated with the shaft or spindle of the lathe or other machine. In this construction of the carrier the chuck is not moved bodily longitudinally in relation to the carrier, but can only turn upon its trunnions 9 in a manner similar to the chuck described in relation to Figs. 1, 2, and 3 and for the purpose of exposing the opposite faces of the chuck. Upon one side of the body of the chuck is formed a projecting ear 17, which is located substantially midway between the opposite faces of the chuck, and upon the carrier are two blocks or projections 18 18, which are located substantially opposite to each other and so that the ear 17 on the chuck will come into contact with the blocks 18 on the carrier when the chuck is turned upon its trunnions. These blocks on the carrier and the ear on the chuck form means to limit the rotary movement of the chuck in opposite directions. The projecting blocks on the carrier are of such a height that they are engaged by the ear on the chuck when the outer face of the chuck is exactly at right angles to the axis of rotation of the chuck and carrier. A headed bolt 19 and a thumb-nut 20 form means to hold the ear on the chuck in contact with the projection on the carrier. In order to prevent the necessity of having to entirely remove the nut from the bolt in order to allow the chuck to be reversed and also to allow of using the same bolt and nut in connection with both of the projections on the carrier, I fork the ear on the chuck and the projections on the carrier substantially as shown, and by this means the bolt with the nut thereon may be inserted easily within the forks in the ear and in the projections or removed therefrom, and when inserted the nut may be turned upon the bolt so as to hold the ear and projection rigidly together and the chuck in its desired position relative to the axis of the shaft or spindle of the lathe or other machine.

In Fig. 6 I have illustrated the carrier 21, which is interposed between the chuck and the shaft or face-plate of the lathe or other machine, as being made substantially hemispherical on its exterior. The face-plate 2 is secured thereto as in the other constructions of carrier, and the body 10 of the chuck is pivotally mounted to said carrier by means of the trunnions 9, having bearings in ears 8, projecting from the carrier in a manner similar to the other carriers shown. The trunnion on one or on both sides of the chuck is provided with an index-plate 22, which is rigidly mounted on the trunnion and has a series of recesses 23 on its edge. A detent-pawl 24 is pivoted at 25 to the carrier and has a spring 26, which tends normally to hold the pawl in contact with the edge of the index-plate and within one of the recesses therein. This index-plate and the detent-pawl form a locking device to lock the chuck at any desired angle dependent upon the location of the recesses on the index-plate, and by this means it will be seen that I am able to clamp or hold a piece at various angles to the carrier. By this construction the chuck is not movable longitudinally in relation to the carrier, but has a rotary movement upon its trunnions only. In this construction the body 10 of the chuck is preferably made spherical on its exterior, and the carrier is made hemispherical on its interior to fit the outer surface of the chuck, as shown in dotted lines in Fig. 6.

When very heavy work is being held in the chuck and when it is essential that there should be as little vibration of the chuck as possible, I may use a back rest or support for the chuck, which back rest or support will furnish a bearing within which the chuck may revolve and which bearing is preferably supplied to the chuck as nearly as possible in the plane of the work being done on the article held in the chuck.

The constructions shown in Figs. 1, 2, 3, 4, and 5 are such that it is very easy to apply a back rest thereto, and I have shown such a back rest in Figs. 4 and 5; but the same could have been supplied to the chuck shown in Figs. 1, 2, and 3, if so desired.

The back rest consists of a ring-shaped frame 27, which is of such a size as to embrace the chuck and its carrier. This frame is provided with a foot-piece 28, adapted to rest upon the bed of the lathe or other machine and to form means whereby the frame is rigidly secured to the bed or to any other stationary part of the lathe or other machine. A plurality of bearing-jaws 29 29 are mounted upon the frame 27 and are adjustable thereon toward and from the center of the frame by means of screws 30, which pass through perforations in the jaws and enter screw-threaded recesses on the frame. The jaws are also slotted, as at 31, to receive the screw-bolts 32 32, which are screwed into screw-threaded recesses in the frame and which act to clamp and hold the jaws firmly in their adjusted positions on the frame. The inner ends of the jaws 29 are adapted to engage and press against the outer cylindrical surface of the carrier, and the adjustment of said jaws allows for any wearing of said jaws on the surface which travels under them, and they also adapt the back rest for use upon chucks and carriers of different outer diameters.

Although the particular shape of the chuck-jaws 11 and the particular mechanism by which they are moved are not essential to the operation of the device whereby the chuck is made reversible or to the mechanism whereby it is clamped in either of its positions, and although it is not essential that the chuck should be what is known as a "universal" chuck and have its jaws all adjusted to the same line and by one operation, I prefer to use chuck-jaws and their operating mechanism which are shaped and constructed substantially in shown in Figs. 1 and 2. In this construction of the chuck the jaws 11 are mounted in guides in the body 10 of the chuck in such a manner that they radiate from the center of the chuck and are movable radially toward and from the center of the chuck. These jaws extend entirely through the body of the chuck, being exposed on the opposite faces of the chuck, and they are provided on their opposite exposed portions with the respective steps 33 33 and 34 34, the steps 34 being preferably arranged substantially opposite the center of the space between two of the steps 33 on the opposite side of the jaw, so as to increase the range of diameters of the articles which may be held by the jaws with a given amount of adjustment of the jaws. Screws 35 are screwed within screw-threaded perforations in the jaws 11 and are rotatably mounted within bearings in the body 10 of the chuck. These screws are prevented from a longitudinal movement within the body 10 of the chuck by means of a shoulder on the screw, which engages a portion of the body 10, and thus prevents an outward movement of the screw, and they are prevented from moving inward by the engagement of the inner end of the screw with a ring 36, which is inserted within the inner circumference of the ring-shaped body 10 of the chuck. These screws project to the outer surface of the body 10 of the chuck and are preferably flush with said surface, being provided with a suitably-shaped recess 37 to receive a wrench by which said screws may be turned in their bearings. By this construction it will be seen that the jaws may be moved toward or from the center of the chuck upon the screw by the rotation of the screw in opposite directions.

In order to obtain a simultaneous movement of all of the jaws 11 by the operation of any one of the screws 35, I provide each screw with a pinion 38, which may be made in one piece with the screw, as shown on the drawings, or it may be made separate therefrom and then rigidly attached thereto. The pinions on the several screws mesh into a ring-shaped or circular rack or gear 39 (shown in section in Fig. 2 and by dotted lines in Fig. 1) and which rack is guided in suitable guides in the body 10 of the chuck. By this means the rotation of one screw with its attached pinion by a suitable wrench or otherwise will cause the rotation of the circular rack, which in turn will impart a rotary movement to the other pinions and their attached screws, and this universal movement of the jaws mounted on said screws in the usual manner of universal chucks.

In Fig. 7 I have shown a preferred form of my reversible chuck, which is desirable for certain classes of work in which it is preferable to dispense with the use of a back rest or other support and have the chuck and the work held thereby close to the head of the lathe or other machine in order to prevent the vibration of the chuck and work under the operation of the tool and at the same time to allow for an easy reversal of the chuck in relation to its carrier. In this construction I prefer to employ a face-plate 2, as in the other constructions, and to attach the carrier to said face-plate in substantially a similar manner, which carrier consists, preferably, of a plate 40, having ears 41 on the face thereof, to which ears is pivotally attached a block 42, so shaped as to allow of a limited movement of said block upon its pivotal connection to the ears 41 on the carrier. Within a bearing in the block 42 is pivotally mounted a trunnion 43, which projects from the chuck-body 10, which has been shown in dotted lines on the drawings and which will allow of the free rotation of the chuck-body upon said trunnion when the chuck-body has been turned to the position shown by full lines in Fig. 7 and its movement arrested by the limitation of the movement of the block 42. The plate 40 is provided with a hinged screw-bolt 44 and thumb-nut 45 thereon, which engage a forked projection 46 on the chuck-body when the chuck-body is turned to a position against the carrier and as shown in dotted lines on the drawings for the purpose of holding the chuck-body and carrier firmly together while the work is being operated upon. Steady-pins 47 on the carrier are arranged to enter recesses or perforations 48 in the chuck-body when said parts are held together, if so desired.

By having the carrier of the chuck provided with a removable face-plate by which it is attached to the shaft or spindle of a lathe or other machine my improved reversible chuck is very easily adapted to any machine, as it is only necessary to provide a face-plate of the proper form without changing any other part of the chuck.

Having thus fully described the nature, construction, and the operation of this my invention, I wish to secure by Letters Patent and claim—

1. In a reversible chuck, the combination with a ring-shaped chuck-body having work-holding jaws and journals diametrically opposite each other on the periphery of said body, of a circular carrier having bearings for said journals and a cavity or recess in its face to receive the chuck-body when being reversed.

2. A reversible chuck consisting of a carrier having means to attach it to the machine upon which it is to be used, a perforated or ring chuck having two axes of rotation at right angles to each other, one of said axes of rotation being in unison with the carrier, chuck-jaws to clamp and hold the work to be operated on, exposed on opposite faces of the chuck-body and having steps on both exposed sides thereof, the steps on one side alternating with the steps on the opposite side, means to move said jaws toward and from the center of the chuck-body, and means to lock the chuck-body firmly to said carrier at different positions relative to the carrier.

3. In a reversible chuck, a member having means to attach it to the shaft or spindle of a lathe or other machine, a sleeve adjustable longitudinally upon said member, a perforated or ring chuck pivotally mounted upon said sleeve and rotatable upon an axis at right angles to and intersecting the axis of rotation of the shaft or spindle of the lathe or other machine on which it is to be used, and a recess in said member into which said chuck-body is centered and firmly held by the longitudinal adjustment of the sleeve upon said member.

4. In a reversible chuck, a cylindrical member having means to attach it to the shaft or spindle of a lathe or other machine and screw-threaded on its exterior, a sleeve adjustable longitudinally upon the screw-threaded member, a perforated or ring chuck pivotally mounted upon said sleeve and rotatable upon an axis at right angles to and intersecting the axis of rotation of the shaft or spindle of the lathe or other machine on which it is to be used, clamped against the surface of said member and held firmly in relation thereto by the longitudinal adjustment of the sleeve upon the said member.

5. In a reversible chuck, a cylindrical member having means to attach it to a lathe or other machine and screw-threaded on the central portion of its exterior, leaving plain cylindrical portions at both ends of said member, a sleeve adjustable longitudinally upon the screw-threads on said member, a perforated or ring chuck pivotally mounted upon said sleeve and rotatable upon an axis at right angles to and intersecting the axis of rotation of the shaft or spindle of the lathe or other machine on which it is to be used, clamped against the surface of said member and held firmly in relation thereto by the longitudinal adjustment of the sleeve upon said member.

6. In a reversible chuck, a carrier, and a chuck-body reversibly mounted thereon, combined with movable jaws constructed with work-holding steps upon opposite sides or faces of said jaws, whereby the chuck-jaws are always ready to receive and to clamp the work irrespective of the face of the chuck-body which is presented, and the work-holding surfaces of said jaws are doubled.

7. A reversible chuck consisting of a carrier adapted to be attached to the machine upon which it is to be used and having a chamber in its face, a perforated or ring-shaped chuck-body having movable work-holding devices around the periphery of said chuck-body, means to pivotally attach said chuck-body to the face of said carrier so that said chuck-body may partially enter said chamber when being reversed to present different sides or faces of the work to the operating-tool, the chuck-body be nearer the attachment of the carrier to said machine and the chuck-body be held firmer, and means to lock said chuck-body firmly to said carrier at different positions relative to the carrier.

8. A reversible chuck consisting of a body portion, clamping-jaws mounted upon said body and exposed on opposite faces of said body, steps on the opposite exposed sides of said jaws, the steps on one side alternating with the steps on the other side, and means to operate said jaws to clamp the work.

9. A reversible chuck consisting of a carrier having means to attach it to the machine upon which it is to be used and provided with a chuck-centering recess in its face, a perforated or ring chuck-body having movable work-holding devices around the periphery of said chuck-body, means to seat and attach said chuck-body to said carrier within the centering-recess therein and to detach and remove said chuck-body from said recess so that said chuck-body may be reversed to present opposite sides or faces of the work to the operating-tool.

In testimony whereof I have affixed my signature in presence of two witnesses.

DANIEL E. KEMPSTER.

Witnesses:
    CORA J. CHADBOURN,
    HENRY CHADBOURN.